Aug. 16, 1927.
L. SAIVES
1,639,536
SELF PROPELLED VEHICLE
Filed April 1, 1924
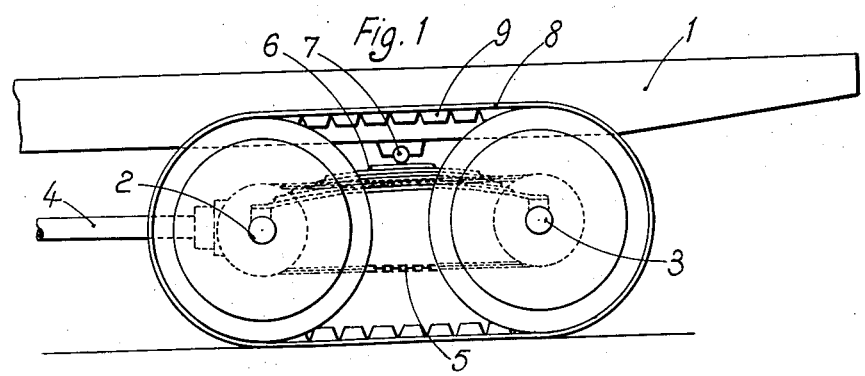
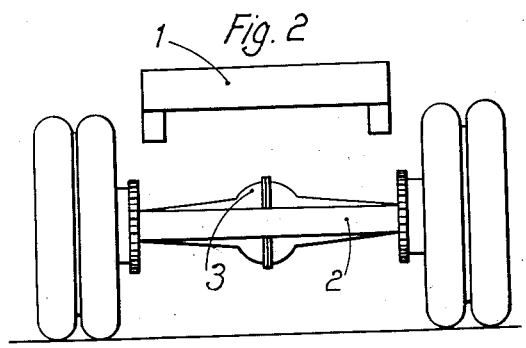
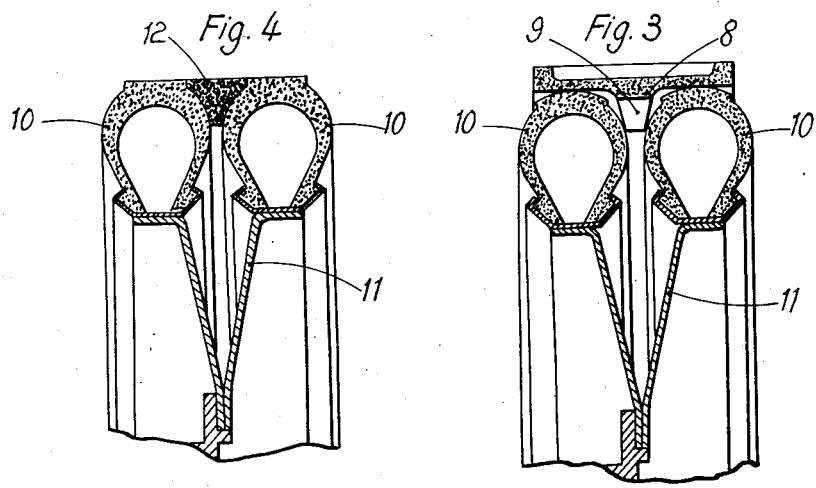
INVENTOR
Léon Saives,
By O'Neill and Bunn
ATTORNEYS.

Patented Aug. 16, 1927.

1,639,536

UNITED STATES PATENT OFFICE.

LÉON SAIVES, OF BILLANCOURT, FRANCE, ASSIGNOR TO LOUIS RENAULT, OF BILLANCOURT, FRANCE.

SELF-PROPELLED VEHICLE.

Application filed April 1, 1924, Serial No. 703,388, and in France May 19, 1923.

The present invention relates to improvements in self propelled vehicles equipped with two rear driving axles and two sets of driving tyres arranged in tandem, and pertains to the use of a flexible endless track band for facilitating travelling over soft or sandy ground.

The flexible endless band for travelling over sandy ground may be in the form of a skeleton endless track, the cross section of which is designed in such a way as to exactly fill up the gap between the two twin tyres, and the exterior surface of which is flush with the two tyre treads, which it thus joins together into a single wide surface, thus giving to the vehicle a wide grip on the ground.

In the accompanying drawing Figure 1 is a side view of the back part of the vehicle provided with the improvements according to the invention. Figure 2 is a back view of the same vehicle, certain parts being omitted; Figures 3 and 4 are sections through the axis of a set of twin wheels.

The underframe 1 of the vehicle has at the back two driving axles 2—3. The former receives motion from the engine, for example by means of a Cardan shaft 4 coming from the change speed gear box. This first axle transmits motion to the second one by means of a chain 5.

These two axles are integral with springs 6, attached at 7 to the underframe 1 by any suitable means.

The transmission shown is given only by way of example; there might be provided any other known means of transmission used on vehicles with six wheels or sets of wheels, the four back wheels of which are driving wheels.

The arrangement, which constitutes more particularly the subject of the invention, consists in attaching twin pneumatic tyres on each of the driving wheels of the vehicle.

Such a vehicle on roads, or even on tracks of comparatively solid ground, could attain normal commercial speeds, and the surface in contact with the ground will be much greater with this set of four wheels with twin tyres, than in the case of a vehicle having only a single driving axle, or even of a vehicle with six wheels, the four driving wheels of which are provided with single tyres.

The invention consists further in adding to these sets of twin wheels for difficult travelling on loose ground, an endless track band 8 provided with wedges 9, which is attached to these wheels. The wedges 9 fit in between the inner sides of the tyres 10 of the twin wheel.

This flexible band may be made of elastic material.

The adhesion of these bands to the tyres will be sufficient, with the materials used, assuming that all the wheels, which they envelope, are driving wheels. It is to be clearly understood that pneumatic tyres might be replaced by solid tyres. In order to be able to fix and remove easily the endless bands, it is necessary to use either easily detachable wheels or easily detachable rims.

In Figure 4, the endless band 12, a flexible band, exactly fills up the gap between the tyres in such manner that it unites the tyre treads, and at the same time prevents sand from getting in between the tyres.

It will be obvious from an examination of the drawing, that this arrangement increases the tread surface or the surface in contact with the ground.

The flexible band will preferably be made of material identical with that of the tyres, in order to render the wear uniform, and to maintain the continuity of the supporting surface.

I claim:

In a self propelled vehicle equipped with a parallel axle double rear drive, the combination of two sets of driving tires arranged in tandem, each set being made up of a plurality of laterally adjacent tires, and a removable endless belt between and supported by the adjacent side of each set of tires, and frictionally driven thereby, the outer surface of the belt being substantially flush with the tire treads.

In testimony whereof I affix my signature

LÉON SAIVES.